(12) United States Patent
Boden et al.

(10) Patent No.: US 9,583,092 B2
(45) Date of Patent: Feb. 28, 2017

(54) SOUND REDIRECTING DEVICE FOR LARGE DISPLAYS

(71) Applicants: Stephen L. Boden, San Clemente, CA (US); Kathleen Marie Boden, San Clemente, CA (US)

(72) Inventors: Stephen L. Boden, San Clemente, CA (US); Kathleen Marie Boden, San Clemente, CA (US)

( * ) Notice: Subject to any disclaimer, the term of this patent is extended or adjusted under 35 U.S.C. 154(b) by 0 days.

(21) Appl. No.: 14/757,781

(22) Filed: Dec. 23, 2015

(65) Prior Publication Data

US 2016/0180831 A1     Jun. 23, 2016

Related U.S. Application Data

(60) Provisional application No. 62/096,485, filed on Dec. 23, 2014.

(51) Int. Cl.
*G10K 11/28* (2006.01)
*H04R 1/34* (2006.01)
*H04N 5/64* (2006.01)

(52) U.S. Cl.
CPC ............ *G10K 11/28* (2013.01); *H04R 1/345* (2013.01); *H04N 5/642* (2013.01); *H04R 2499/15* (2013.01)

(58) Field of Classification Search
CPC .... H04M 1/035; H04M 1/2155; H04R 1/345; H04R 2499/15; G10K 11/28
USPC .................................. 181/175, 191, 192, 199
See application file for complete search history.

(56) References Cited

U.S. PATENT DOCUMENTS

| 2,643,727 | A | | 6/1953 | Leon | |
|---|---|---|---|---|---|
| 4,907,671 | A | | 3/1990 | Wiley | |
| 5,452,025 | A | | 9/1995 | Koizumi | |
| 5,778,062 | A | * | 7/1998 | Vanmoor | H04M 1/0202 379/433.01 |
| 5,943,430 | A | | 8/1999 | Saitoh | |
| 6,257,365 | B1 | | 7/2001 | Hulsebus, II | |
| 6,324,052 | B1 | * | 11/2001 | Azima | G06F 1/1616 361/679.23 |

(Continued)

OTHER PUBLICATIONS

Samsung, Soundverter, http://www.soundverter.com/customersgallery/, downloaded on Dec. 5, 2014, 6 pages.

(Continued)

*Primary Examiner* — Jeremy Luks
(74) *Attorney, Agent, or Firm* — Fish & Tsang LLP

(57) ABSTRACT

Sound reflectors for an electronic device are provided. In one embodiment, the sound reflector has a sound redirecting surface having two curvatures. The first concave curvature is in one plane and the second curvature is in another plane, and the first and second curvature's planes are in obtuse angle with each other. In other embodiments, the sound reflector has a device attachment surface configured to attach to a back of the display device, which the sound reflector is coupled with, and a sound redirecting surface. The sound redirecting surface has a proximal portion that extends backwards relative to the device attachment surface, and a distal portion that extends forward relative to the attachment surface. The sound redirecting surface is disposed to directly receive sound emanating from the speaker.

19 Claims, 8 Drawing Sheets

(56) References Cited

U.S. PATENT DOCUMENTS

| | | | | |
|---|---|---|---|---|
| 8,320,597 B2* | 11/2012 | Griffin, Jr. | ............ | H04R 1/2857 |
| | | | | 181/179 |
| 8,483,420 B2* | 7/2013 | Kim | ......................... | H04R 1/30 |
| | | | | 381/337 |
| 8,700,107 B1* | 4/2014 | Oh | ......................... | H04M 1/04 |
| | | | | 381/322 |
| 8,731,219 B2 | 5/2014 | Weiss | | |
| 8,944,209 B1* | 2/2015 | Fields | ................... | G10K 11/08 |
| | | | | 181/175 |
| D731,468 S * | 6/2015 | Wilkerson | ................... | D14/217 |
| 9,172,781 B1* | 10/2015 | Goldstein | ............ | H04M 1/0202 |
| 9,241,055 B1* | 1/2016 | Barker | ................... | H04M 1/04 |
| 2006/0187364 A1* | 8/2006 | Fukano | ................. | H04N 5/642 |
| | | | | 348/836 |
| 2007/0223745 A1 | 9/2007 | Feng et al. | | |
| 2008/0170724 A1 | 7/2008 | Cancelmo | | |
| 2010/0206923 A1* | 8/2010 | McNamara | .......... | H04B 1/3888 |
| | | | | 224/191 |
| 2010/0290659 A1* | 11/2010 | Tagami | ................. | H04R 1/345 |
| | | | | 381/352 |
| 2012/0027237 A1* | 2/2012 | Lin | ......................... | H04R 1/02 |
| | | | | 381/340 |
| 2012/0241247 A1 | 9/2012 | Choe | | |
| 2012/0303146 A1 | 11/2012 | Genov et al. | | |
| 2013/0048413 A1* | 2/2013 | Patzer | .................... | H04M 1/04 |
| | | | | 181/199 |
| 2013/0134291 A1 | 5/2013 | Le Gette et al. | | |
| 2013/0322660 A1* | 12/2013 | Weiss | .................... | G10K 11/28 |
| | | | | 381/160 |
| 2013/0329927 A1 | 12/2013 | Samarakoon | | |
| 2014/0183321 A1* | 7/2014 | Tsai | ....................... | F16M 13/00 |
| | | | | 248/371 |
| 2014/0247958 A1* | 9/2014 | Chen | ..................... | H04R 1/345 |
| | | | | 381/387 |
| 2015/0010190 A1 | 1/2015 | Lee et al. | | |
| 2015/0014087 A1 | 1/2015 | Coates | | |
| 2015/0027802 A1* | 1/2015 | Altschul | ................ | A45C 11/00 |
| | | | | 181/177 |
| 2015/0041245 A1* | 2/2015 | Smith | .................... | G10K 11/28 |
| | | | | 181/202 |
| 2015/0053497 A1* | 2/2015 | Horiuchi | ................ | H04N 5/642 |
| | | | | 181/199 |
| 2015/0098601 A1 | 4/2015 | Absher et al. | | |
| 2015/0131836 A1 | 5/2015 | Hoshikawa | | |

OTHER PUBLICATIONS

Trendhunter Tech, Sound-Magnifying Tablet Accessories, http://www.trendhunter.com/trends/boast-sound-reflector, Downloaded on Oct. 23, 2014, 3 pages.

* cited by examiner

SOUND REDIRECTING DEVICE FOR LARGE DISPLAYS

This application claims priority to our U.S. provisional patent application with the Ser. No. 62/096,485 filed Dec. 23, 2014 which is incorporated by reference herein in its entirety.

FIELD OF THE INVENTION

The field of the invention is sound redirecting devices.

BACKGROUND

The following description includes information that may be useful in understanding the present invention. It is not an admission that any of the information provided herein is prior art or relevant to the presently claimed invention, or that any publication specifically or implicitly referenced is prior art.

Many electronic devices including flat screen televisions and mobile devices have built-in speakers, and most of the built-in speakers for such electronic devices are down-firing speakers. However, because of their relatively smaller size and location in the back, bottom or side of the device, the speakers of such devices often cannot produce sound waves that transmit only indirectly to the user. Rather, sound waves are directed to objects nearby the electronic devices, and the sometimes tortuous reflected paths can produce decidedly deteriorated sound quality.

Some efforts have been made to improve the sound quality from the down-firing speakers. For example, U.S. Patent Application 2013/0303146A1 to Genoa discloses a sound enhancer coupleable to a portable media. The sound enhancer can redirect sound from a side-mounted or back-mounted speaker of the portable media player towards a user for enhancing the user's audio experience. However, the size of Genoa's sound enhancer is limited to the length or width of the speaker, and the use is therefore limited to many portable electronic devices.

Others have made efforts to enhance the sound emitted from device speakers. For example, U.S. Pat. No. 8,731,219 to Weiss discloses a reflector for use with an electronic device having a loudspeaker. The reflector of Weiss has a flat portion located to be adjacent a surface of the electronic device, and a concave portion adjacent to the flat portion and presenting a concave surface to the loudspeaker. However, similar to Genoa, the size of this reflector is also generally limited to a size of the speaker. Further, the direction of sound reflection cannot be adjusted based on the user's needs.

U.S. Pat. No. 6,257,365 to Hulsebus III discloses a speaker system that includes a cone reflector connected to a speaker driver. The cone reflector has at least one included angle used to reflect sound in a desired pattern in the horizontal and vertical planes. The reflecting surface can be flat, concave, or in combination of multiple angle flat surfaces. The reflector can be attached to the speaker, or can be free-standing. However, due to its cone-shape, the Hulsebus reflector is not suitable for use with many televisions, and in particular with flat screen TVs.

U.S. Patent Application 2012/0241247A1 to Choe discloses audio enhancer for very small devices, e.g., smart phones and smart tablets, where the reflector portion can be flat or curved. This audio enhancer can be attachable and detachable to an audio producing device.

U.S. Patent Application 2015/0131836A1 to Hoshikawa discloses a sound guiding device for an electronic device with a rear-facing speakers. In Hoshikawa, the sound guiding device is attached to a case of mobile terminal device such that a curved portion of the device receives sounds from the rear-facing speaker and redirects the sounds toward the front of the device.

Interestingly, none of the above discloses a sound reflector or a sound redirective device for flat screen TVs that properly accommodates different positioning of the speaker(s). Thus, there is still a need for a system that can effectively redirect the sound from the built-in speaker of a flat screen TV, regardless of the front to back location of the speaker(s).

SUMMARY OF THE INVENTION

The inventive subject matter provides apparatus, systems and methods in which a sound reflector reflects sound from the sides or bottom of an electronic device, especially a flat screen TV. One aspect of the inventive subject matter includes sound reflectors. The sound reflectors comprise a horizontally extended sound redirecting surface, which has at least a first concave curvature in a first plane and (b) a second curvature in a second plane, and the first and second plane are at an obtuse angle. In addition, preferred sound reflectors have a connector configured to removably couple the sound reflector to the device.

Another aspect of the inventive subject matter includes sound reflectors for a display device having a front and a back, and a speaker. The sound reflector has a device attachment surface configured to attach to a back of the display device, and a sound redirecting surface. The sound redirecting surface has a proximal portion that extends backwards relative to the device attachment surface, and a distal portion that extends forward relative to the attachment surface. The sound redirecting surface is disposed to directly receive sound emanating from the speaker.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
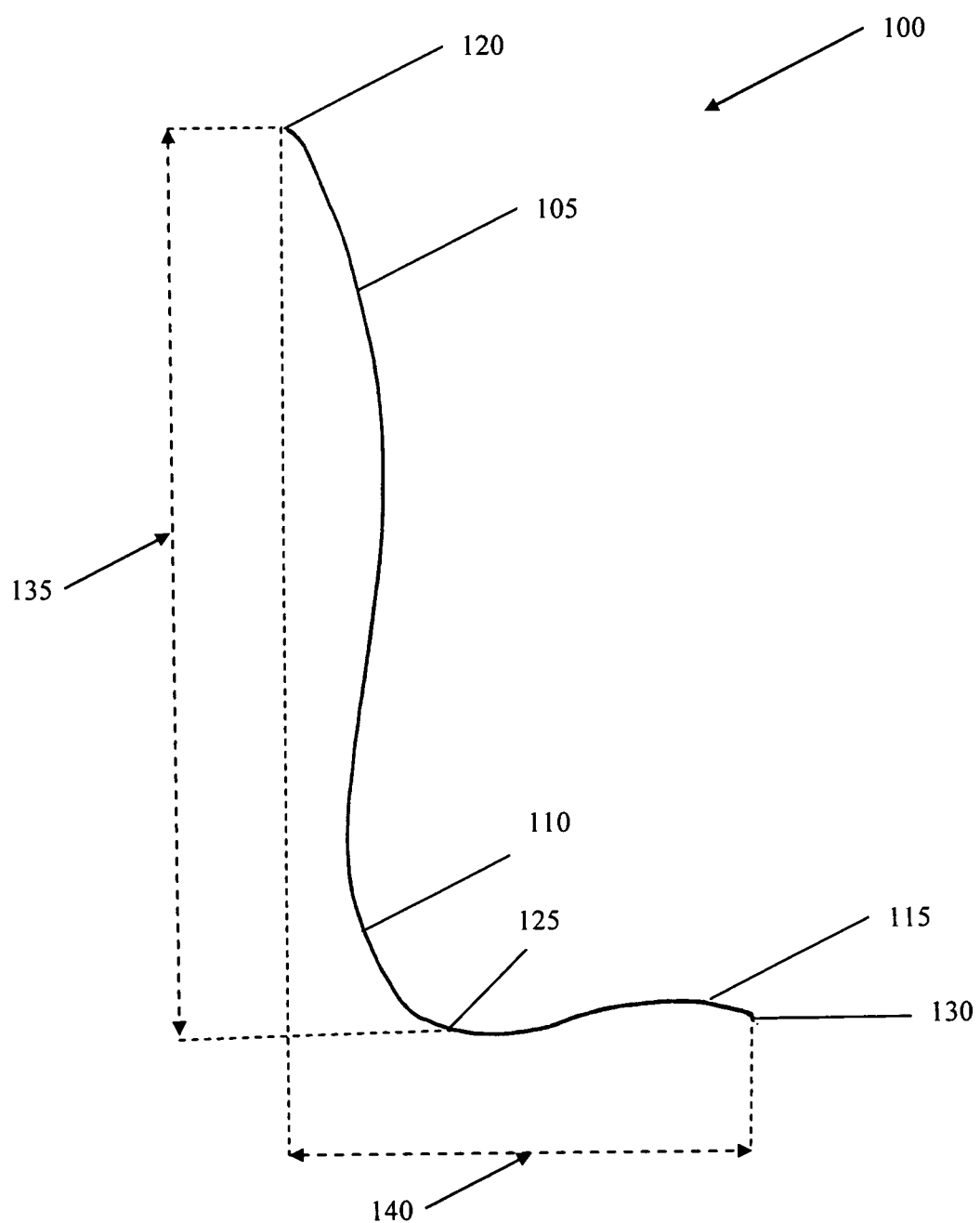
FIG. 1 is a cross sectional view of one embodiment of a sound reflector.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Moreover, and as used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Further, the terms "coupled to" and "coupled with" are used euphemistically in a networking context to mean "communicatively coupled with" where two or more devices are configured to exchange data (e.g., uni-directionally, bi-directionally, peer-to-peer, etc.) with each other possibly via one or more intermediary devices.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

One should appreciate that the disclosed techniques provide many advantageous technical effects including reducing the load on individual computing elements and the collective network by eliminating the need to constantly re-calculate or recreate every possible representation of a user's state of mind in order to adequately respond to the user's state of mind.

The present invention relates to a sound reflector for redirecting sounds emitted from an electronic device. The electronic device can be any electronic device including a television (e.g., a flat screen television, etc.), a mobile device (e.g., mobile phone, a mobile tablet, etc.), a speaker (a portable speaker, a wall mount speaker, an internal speaker, a freestanding speaker, a sound bar, etc.).

Preferred sound reflectors include a horizontally extended sound redirecting surface having at least a first concave curvature in a first plane and a second curvature in a second plane. As used herein, the plane of the curvature is defined as a plane comprising a tangential line at a point of curvature where the radius of the curvature is the largest. In an especially preferred embodiment, the first or the second curvature can comprise a convex curvature or a concave curvature. The convex or concave curvature can be within 5 degrees, 10 degrees, 15 degrees, 30 degrees, 60 degrees, 90 degrees from at least a portion of one or more adjacent planes. However, in some embodiments, it is contemplated that the first or the second curvature can comprise a straight plane.

In some embodiments, the second plane is out of parallel with the first plane. It is contemplated that the first plane and the second plane intersect with each other at a degree less than 30 degree, preferably 60 degree, more preferably 90 degree, and most preferably at an obtuse angle (e.g., 100 degree, 120 degree, etc.)

FIG. 1 shows an example of a cross-sectional side view of a preferred sound reflector. In this example, the sound reflector 100 has a surface comprising a convex curvature 105, a concave curvature 110, and a convex curvature 115. The convex curvature 105 and the concave curvature 110 are smoothly continuous with each other, and the concave curvature 110, and a convex curvature 115 are smoothly continuous with each other.

Contemplated sound reflectors can have different heights to accommodate different sizes of electronic devices and speakers. The height of the sound reflector is defined herein to be the distance between (1) the end point of the first curvature and (2) a point of the second curvature that is closest to the ground or farthest from the device when it is installed on, or coupled with, the device. For example, in the embodiment shown in FIG. 1, the sound reflector 100 can be installed on the flat screen television by coupling the curvature 105 to the back of the flat screen television. When installed, the point 125 of the concave curvature 110 is closest to the ground, or farthest from the device. Then, the height 135 of the sound reflector can be measured as a distance between the endpoint 120 of the convex curvature 105 and the point 125 of the concave curvature 110. In a preferred embodiment, the height 135 of the sound reflector can be less than 5 inches. However, it is also contemplated that the height 135 of the sound reflector can be less than 20 inches, 15 inches, 10 inches, 2 inches, 1 inch, or 0.5 inch.

Independently of their heights, contemplated sound reflectors can have different widths to accommodate different sizes of electronic devices and speakers. The width of the reflector is defined herein to the distance between the end point of the first curvature and the end point of the last curvature of the sound reflector. For example, in the embodiment shown in FIG. 1, the third curvature 115 is the last curvature of the sound reflector 100, and the width 140 can be measured as a distance between the end point 120 of the convex curvature 105 and the point 130 of the last convex curvature 115. In a preferred embodiment, the width 140 of the sound reflector can be less than 5 inches. However, it is also contemplated that the width 140 of the sound reflector can be less than 20 inches, 15 inches, 10 inches, 2 inches, 1 inch, or 0.5 inch.

Figure 2:
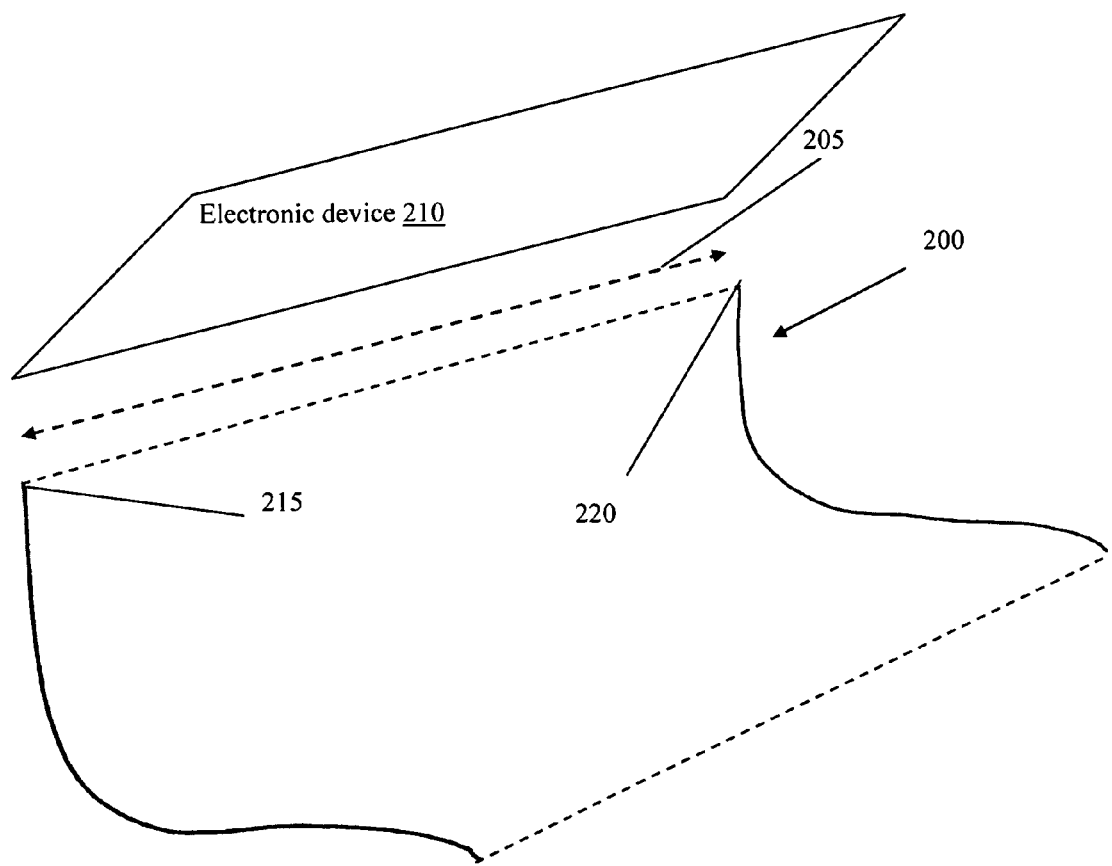
FIG. 2 is a side perspective view of the sound reflector of FIG. 1.

Still further, contemplated sound reflector can vary in their lengths, independently of their heights and widths. The length of the sound reflector is defined herein to be the distance between the left farthest point to the right farthest point when installed or coupled with the electronic devices. For example, FIG. 2 shows a perspective view of a lower portion of sound reflector 200 coupled with the electronic device 210. In this embodiment shown in FIG. 2, sound reflector's length 205 is the distance between the leftmost point 215 and the rightmost point 220. In one embodiment, the length 205 of the sound reflector can be less than 2 inches. However, it is also contemplated that the length 205 of the sound reflector can be less than 1 inches, 6 inches, 10 inches, 14 inches, 20 inch, or 25 inches.

In some embodiments, the sound reflector can comprise a first and a second member, and the length, height, or width of the sound reflector can be extended by telescoping the first and the second member. In this embodiment, the first member and the second member of the sound reflector are horizontally or vertically connected with each other, and the first member can be placed inside of the second member. The length of the sound reflector can be extended by slidingly moving the first member of the sound reflector out of the second member horizontally. The height or the width of the sound reflector can be extended by slidingly moving the first member of the sound reflector out of the second member vertically.

The surface of the sound reflector can comprise any suitable material or materials. Suitable materials include synthetic polymers (e.g., Acrylonitrile butadiene styrene (ABS), Polyethylene terephthalate (PET), Polyethylene (PE), High-density polyethylene (HDPE), Polyvinyl chloride (PVC), Low-density polyethylene (LDPE), Polypropylene (PP), Polystyrene (PS), Polycarbonate (PC), or any other suitable types of synthetic polymers), metals (e.g., stainless steel, gold, silver, any alloys, etc.), natural materials (e.g., rubber, wood, stone, fibers, etc.), silicon, or ceramics. In some embodiments, at least a portion of the surface of the sound reflector comprises one or more biodegradable materials.

In some embodiments, at least a portion of the surface of the sound reflector comprises one or more elastic materials (e.g., rubber, silicon, etc.). In other embodiments, at least a portion of the surface of the sound reflector comprises a user-moldable material (e.g., moldable silicones, moldable plastics, etc.) As used herein the term "user moldable materials" refers to materials that can be inelastically re-shaped by a user without breakage. For example, in some embodiments, a user can inelastically change the first curvature of the sound reflector from convex to concave, or from concave to convex. The user can also change the first curvature of the sound reflector less curved or more curved. It is preferred that the surface is sufficiently flexible to provide user adjustment of sound from the electronic device by at least 10 degrees, 20 degrees, 30 degrees, 60 degrees, 90 degrees, 120 degrees, or 180 degrees. The user moldable material is distinguished from elastic material by its character that once the shape is changed, the changed shape can be substantially maintained without further external force.

In some embodiments, it is also contemplated that at least a portion of the surface of the sound reflector can comprise a material that can change shape (elastically or inelastically) as a function of an environmental change (e.g., light, temperature, noise, distance from the nearby object, etc.)

Figure 3A:
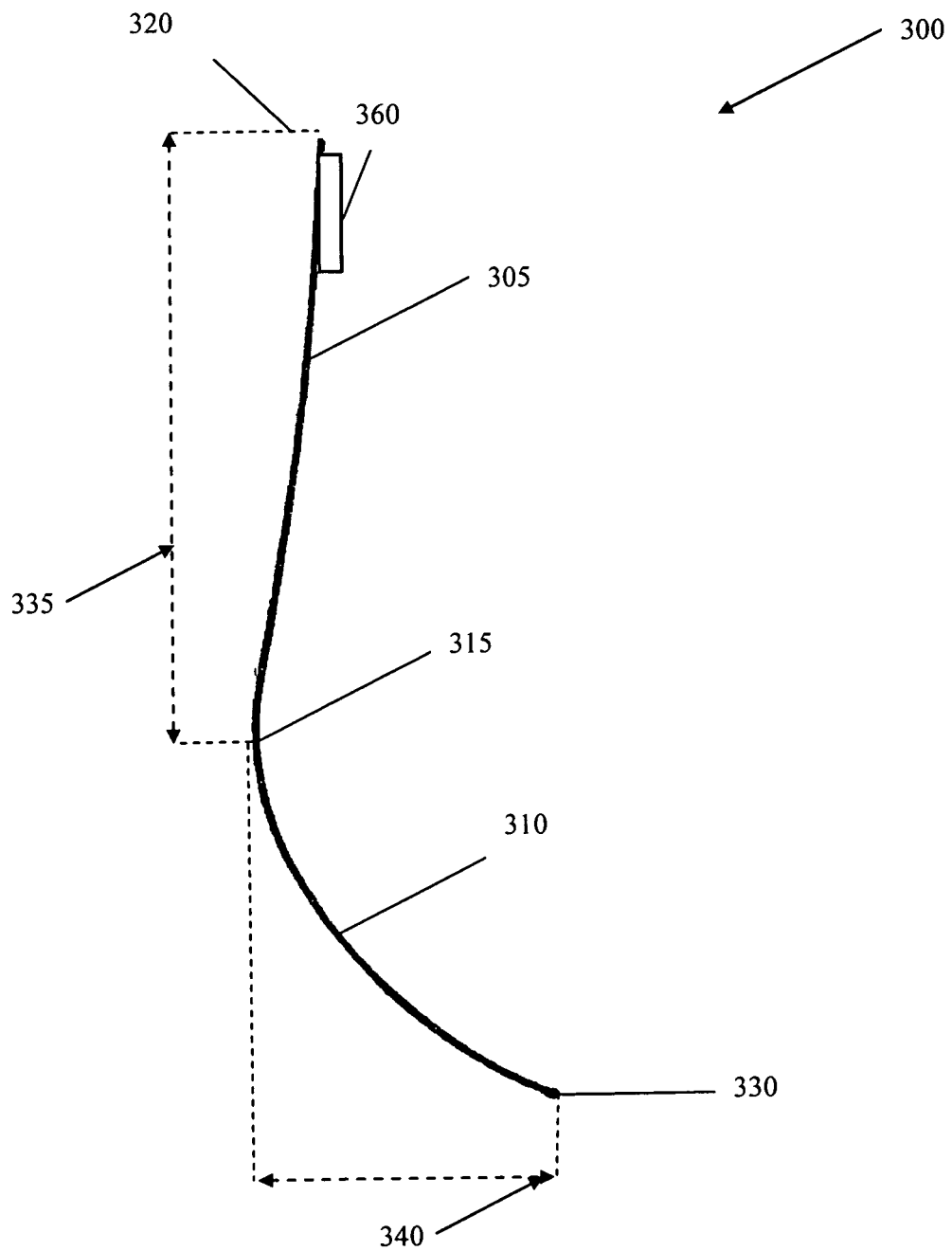
FIG. 3A is a cross sectional view of another embodiment of a sound reflector.

FIG. 3A shows an example of a cross-sectional side view of another preferred sound reflector. In this example, the sound reflector 300 has a surface comprising a convex curvature 305, and a concave curvature 310. The convex curvature 305 and the concave curvature 310 are smoothly continuous with each other.

Similar to the sound reflector 100 of FIG. 1, the sound reflector 300 can be installed on the flat screen television by coupling the curvature 305 to the back of the flat screen television. When installed, the point 330 of the concave curvature 310 is closest to the ground, or farthest from the device. Then, the height 335 of the sound reflector can be measured as a distance between the endpoint 320 of the convex curvature 305 and the point 330 of the concave curvature 310. In a preferred embodiment, the height 335 of the sound reflector can be less than 5 inches. However, it is also contemplated that the height 335 of the sound reflector can be less than 20 inches, 15 inches, 10 inches, 2 inches, 1 inch, or 0.5 inch.

In this embodiment, the width of the reflector is defined herein to the distance between the end point of the first curvature and the end point of the last curvature of the sound reflector. For the sound reflector 300, the second curvature 310 is the last curvature of the sound reflector 300, and the width 340 can be measured as a distance between the end point 315 of the convex curvature 305 and the point 330 of the last convex curvature 310. In a preferred embodiment, the width 140 of the sound reflector can be between 1 inch and 2 inches. However, it is also contemplated that the width 340 of the sound reflector can be between 0.5 inch and 1 inch, between 2 inches to 4 inches, between 4 inches to 8 inches, etc.

In some embodiments the sound reflector can comprises one or more connector 360 that can removably couple the sound reflector from a television or mobile device. The connector can be any suitable fastening means, including Velcro™ or other hook and loop type of fastener, a rubber band, a zipper, a button, a hook, a synthetic fiber tape, a vinyl tape, a cotton tape, a magnet, a string, or a wire, etc. In some embodiments, the connector can be a flexible material (e.g., rubber, fibers, etc.) to wrap around at least a portion of the electronic devices.

It is also contemplated that the sound reflector is permanently affixed to (e.g., molded, glued, welded, etc.) the electronic device (e.g., a television or mobile device, etc.). For example, at least a portion of the convex curvature 305 is molded with a portion of a frame (e.g., back cover of the television, etc.) of the electronic device so that the sound reflector is a part of the frame of the electronic device.

In some embodiments, the sound reflector can be assembled as a part of the electronic device. For example, the sound reflector can be slidably inserted between the back cover and other components of the electronic device such that at least a portion of the sound reflector can be slidably pulled out from the electronic device when it is in use, and slidably inserted to the electronic device when it is not used.

Figure 3B:
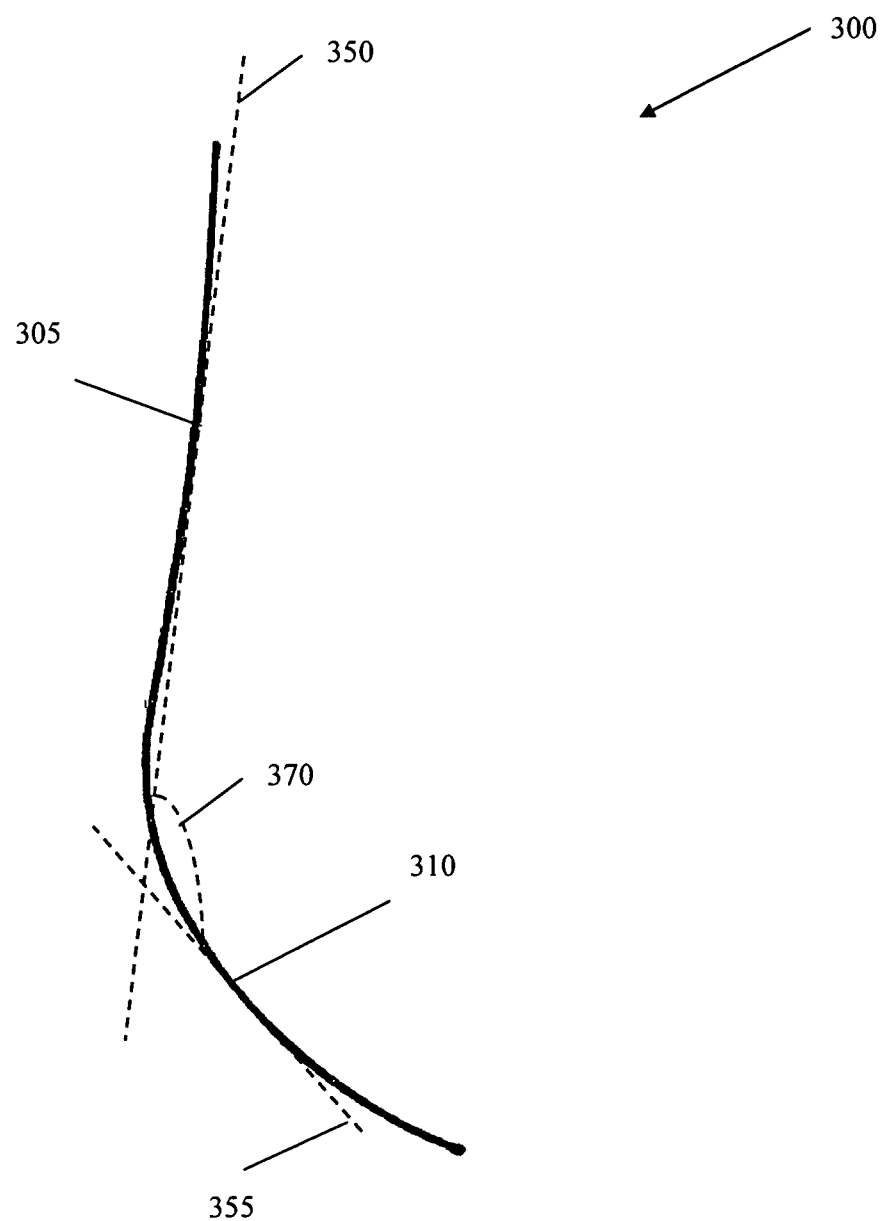
FIG. 3B is a cross sectional view of the sound reflector of FIG. 2A
Figure 3C:
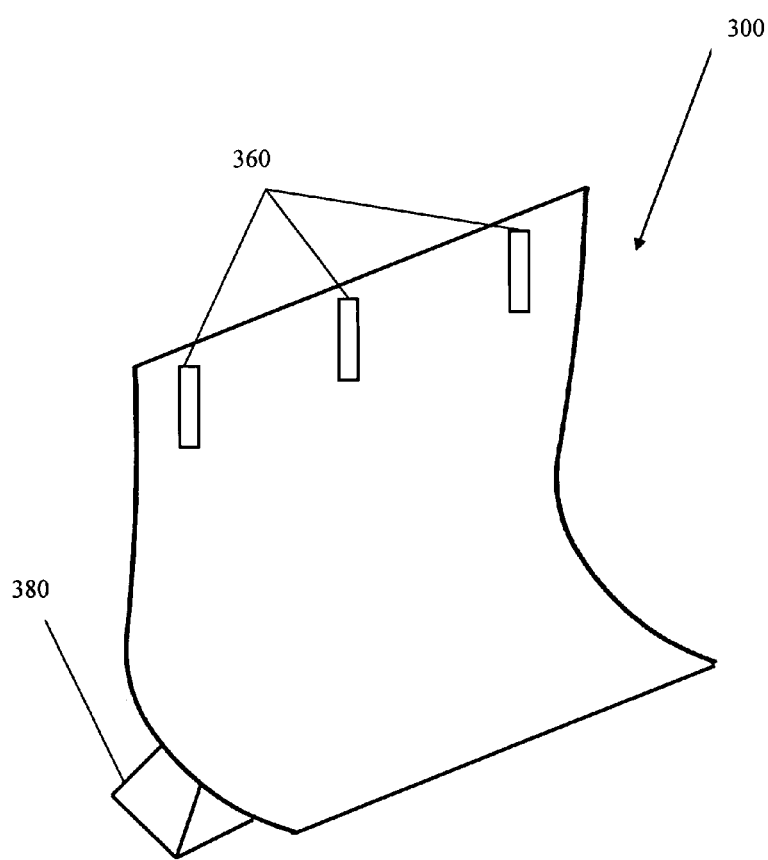
FIG. 3C is a side perspective view of the sound reflector of FIGS. 2A-B.

In some embodiments, as shown in FIG. 3C, the sound reflector 300 can comprise a base 380 that can support the sound reflector. It is especially preferred that the sound reflector 300 has the base when the electronic device has a weight of at least 5 pound. In some embodiments, the base 380 of the sound reflector 300 can comprise a base that is horizontally rotatable relative to the surface.

In these embodiments, it is contemplated that the sound reflector can be freestanding. The base 380 of the sound reflector 300 can further be legs to support and balance the sound reflector. In some embodiments, some contemplated sound reflectors can have front and back or left and right legs. In some embodiments, it is also contemplated that the sound reflector has at least three or more legs.

Preferably, in the sound reflector 300, as shown in FIG. 3B, the first curvature 305 is in a first plane 350 and the second curvature 310 is in a second curvature 355. Preferably, the first plane 350 and the second plane 310 are cross at an angle 370 of an obtuse angle (e.g., 100 degrees, 120 degrees, etc.), which effectively redirects sounds emanated from downward speakers of the electronic device.

Figure 4:
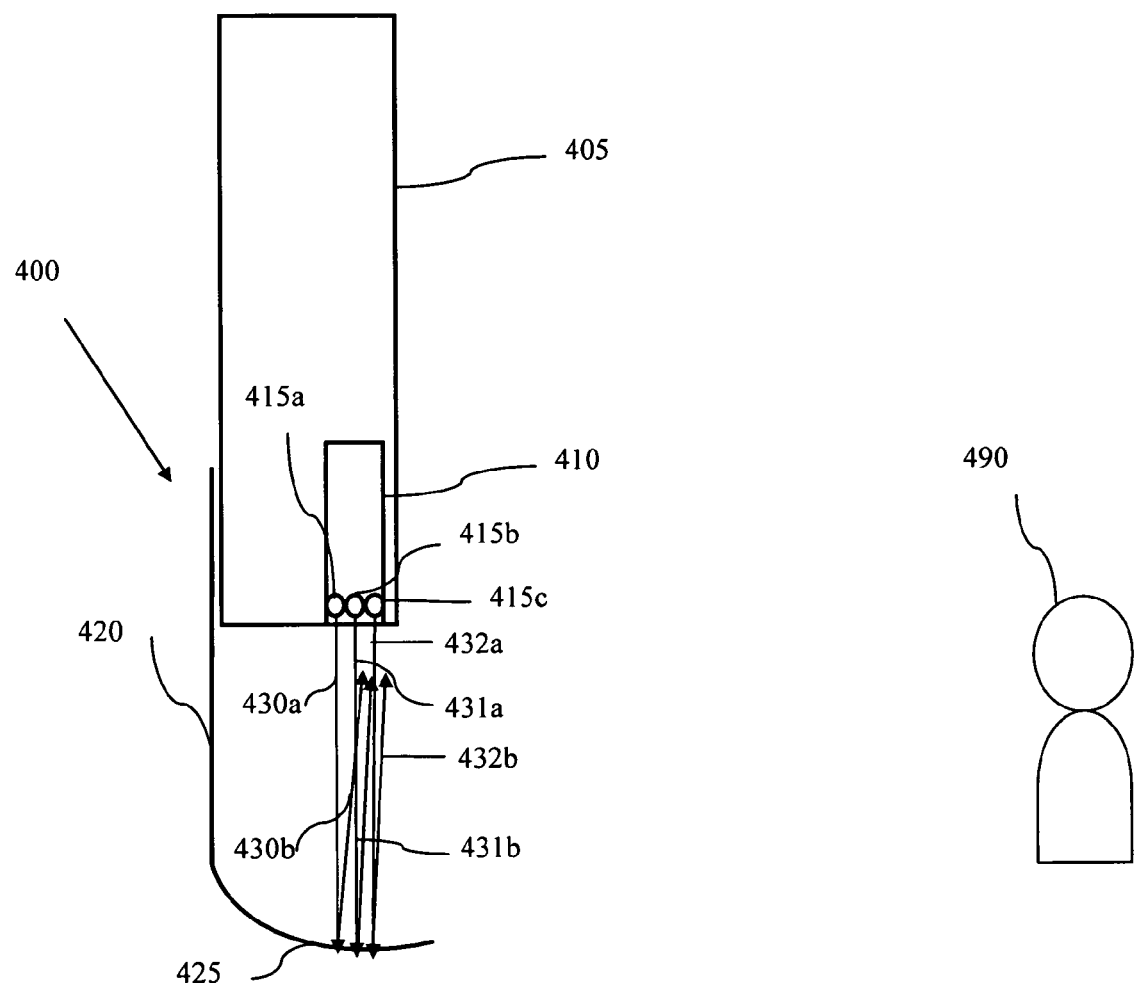
FIG. 4 is a cross sectional view of an electronic device attached with a sound reflector of prior art.

FIG. 4 shows an embodiment of sound reflector 400 of prior art coupled with an electronic device 405 having a speaker 410 with sound emitting portions 415a, 415b, 415c. The traditional sound reflector 400 is generally shaped as "J", which has a straight portion 420 and a curvature portion 425. The plane of the straight portion 420 and the plane of the curvature portion 420 are generally at the right angle. In this embodiment, the speaker 410 with sound emitting portions 415a, 415b, 415c is located close to the front of the electronic device 405. Sounds 430a, 431a, 432a emitted from the sound emitting portions 415a, 415b, 415c are unlikely to be redirected to a user 490 because the tangential lines of the curved portion 425, especially at a distal end (the end closest to the user 490) are almost parallel to the bottom of the electronic device 405. Instead, the redirected sounds 430b, 431 b, 432b are redirected toward the bottom of the electronic device 405.

Figure 5A:
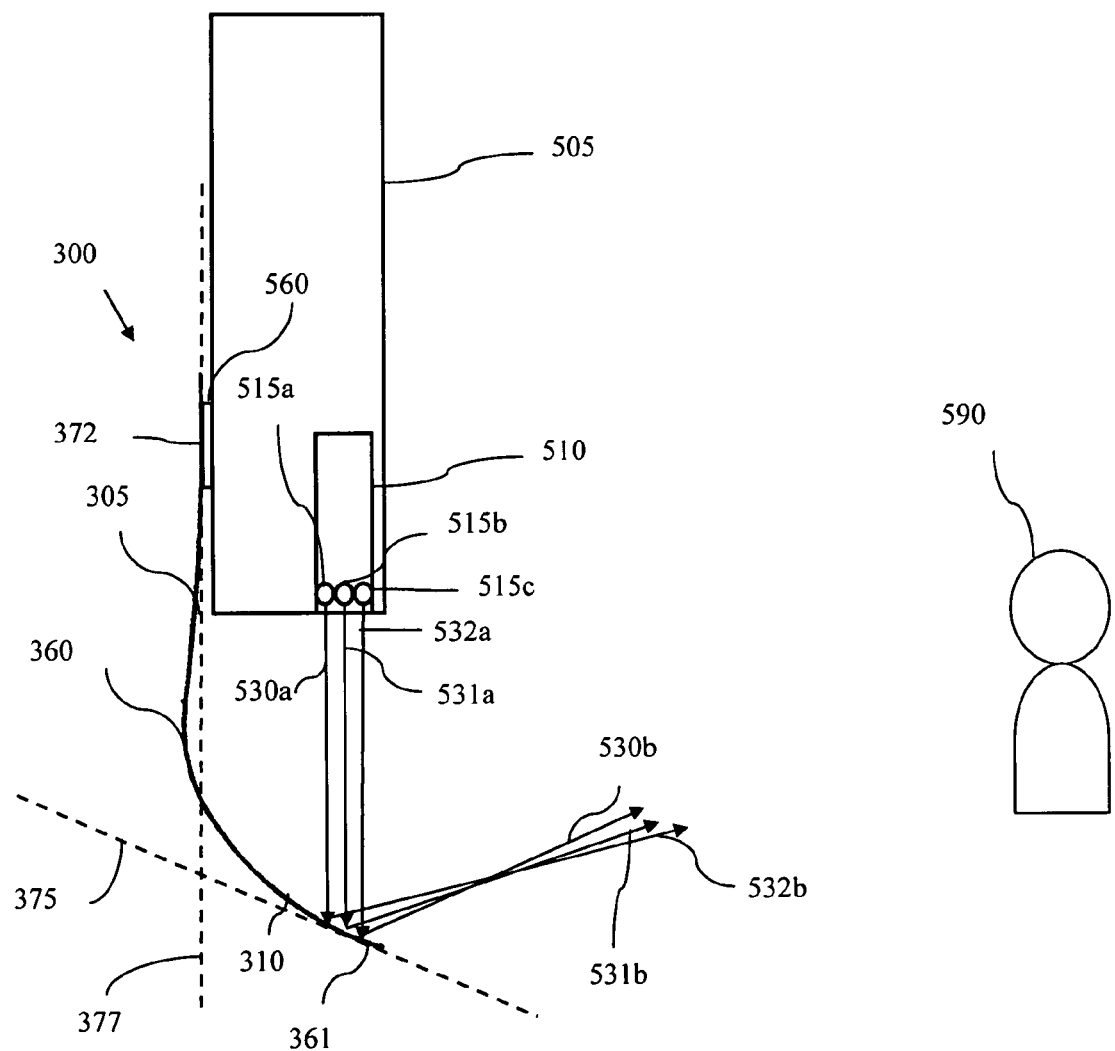
FIG. 5A is a cross sectional view of one embodiment of an electronic device with a speaker attached with the sound reflector of FIGS. 3A-C.

FIG. 5A shows an embodiment of sound reflector 300 described in FIG. 3A-C, coupled with an electronic device 505 having a speaker 510 with sound emitting portions 515a, 515b, 515c. In this embodiment, the speaker 510 with sound emitting portions 515a, 515b, 515c is located close to the front of the electronic device. Sounds 530a, 531a, 532a emitted from the sound emitting portions 515a, 515b, 515c are likely to be redirected to a user 590 because the tangential lines of the curved portion 525 are not parallel to the bottom of the electronic device 505. Thus, instead of reflecting the sound 530a, 531a, 532a to the bottom of the electronic device 505, the sound reflector 300 redirects the emitted sounds 530a, 531a, 532a to the directions 530b, 531b, 532b towards the user 590.

The sound reflector 300 is coupled with the electronic device 505 via a device attachment surface 372, which is an upper portion of the convex curvature 305, which is placed in a generally vertical plane 377. The concave curvature 310 has a proximal portion 360 and a distal portion 361, and the concave curvature 310 meets with the convex curvature 305 at a proximal portion 360 of the concave curvature 310. The distal portion 361 of the concave curvature 310 is placed in a plane 375 that is obtuse relative to the generally vertical plane 377. As used herein, the plane 375 of the distal portion 361 is defined as a tangent at the at least last 2 cm of the distal portion 361 of concave curvature 310.

The concave structure 310 is a sound redirecting surface, which is disposed below the downward speaker such that it directly receives a major portion (e.g., at least 70%, preferably at least 80%, more preferably at least 90%) of the sound emanating from the speaker.

As shown in FIG. 5A, the proximal portion 360 of the concave curvature 310 (sound redirecting surface) extends backwards relative to the device attachment surface, and the distal portion 361 of the concave curvature 310 (sound redirecting surface) extends forward relative to the attachment surface 372.

The reader will hopefully appreciate that FIG. 2 shows a device with the greater curve, along height 135, positioned rearward of the TV, and the lesser curve, along height 140, facing the viewer. FIG. 5A shows the shorter portion positioned rearward of the TV and the longer portion facing the viewer. Both embodiments are contemplated, as are embodiments where the portion positioned rearward of TV is approximately equal height to that facing the viewer.

Figure 5B:
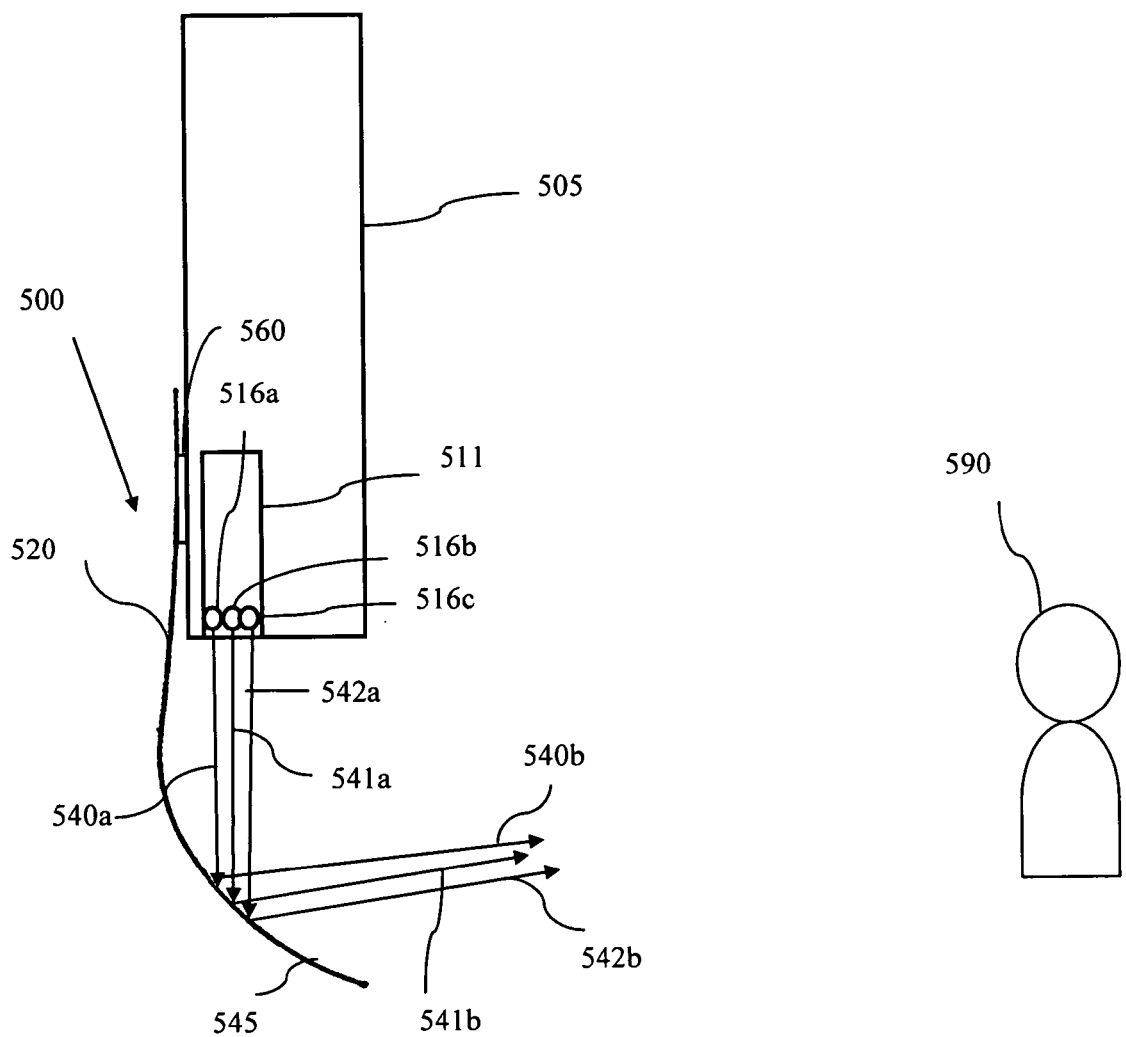
FIG. 5B is a cross sectional view of another embodiment of an electronic device with a speaker attached with the sound reflector of FIGS. 3A-C.

FIG. 5B shows an embodiment of sound reflector 300 described in FIG. 3A-C, coupled with an electronic device 505 having a speaker 511 with sound emitting portions 516a, 516b, 516c. In this embodiment, the speaker 510 with sound emitting portions 516a, 516b, 516c is located close to the back of the electronic device. Sounds 540a, 541a, 542a emitted from the sound emitting portions 516a, 516b, 516c are likely to be redirected to a user 590 because the tangential lines of the curved portion 525 are not parallel to the bottom of the electronic device 505. Thus, instead of reflecting the sound 540a, 5341a, 542a to the bottom of the electronic device 505, the sound reflector 300 redirects the emitted sounds 540a, 54a, 542a to the directions 540b, 541b, 542b towards the user 590. Thus, the sound reflector 300 is capable of redirecting sounds vertically emitted from the speaker of the electronic device regardless the location of the speaker (e.g., front of the device, back of the device).

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A sound reflector for an electronic device, the electronic device having a downward facing speaker disposed in a housing, the sound reflector comprising:
   an attachment surface configured to attach to the housing;
   a first sound redirecting surface extending backwardly and convexly from the attachment surface; and
   a second sound redirecting surface extending concavely downward from the first sound redirecting surface.

2. The sound reflector of claim 1, further comprising a connector configured to removably couple the sound reflector from the electronic device.

3. The sound reflector of claim 1, wherein the first sound redirecting surface is in a first plane and the second sound redirecting surface is in a second plane, and the first and second plane are at an obtuse angle with each other.

4. The sound reflector of claim 3, where the first and second planes angled at more than 100 degree with each other.

5. The sound reflector of claim 1, further comprising a third sound redirecting surface extending convexly from the second sound directing surface.

6. The sound reflector of claim 1, where the first sound redirecting surface is smoothly continuous with the second sound redirecting surface.

7. The sound reflector of claim 1, wherein at least a portion of the first sound redirecting surface comprises a plastic material.

8. The sound reflector of claim 1, wherein at least a portion of the first redirecting surface comprises a user-moldable material.

9. The sound reflector of claim 1, wherein at least one of the first and second sound redirecting surfaces is sufficiently flexible to provide user adjustment of sound from the electronic device by at least 30 degrees.

10. The sound reflector of claim 2, wherein the connector is magnetic.

11. The sound reflector of claim 1, wherein the electronic device has a weight of at least 5 pounds, and further comprising a base that supports the device.

12. The sound reflector of claim 1, wherein at least a portion of the sound reflector is molded with at least a portion of the electronic device.

13. The sound reflector of claim 1, wherein at least a portion of the sound reflector is affixed to at least a portion of the electronic device.

14. A sound reflector for a display device, the display device having a housing with a front face and a back face, and a downwardly facing speaker disposed in a housing, the reflector comprising:
a device attachment surface configured to attach to the back surface of the housing; and
a sound redirecting surface having a proximal portion that extends backwardly and convexly relative to the device attachment surface, and a distal portion that extends forward relative to the attachment surface, and wherein the distal portion is disposed to directly receive sound emanating from the speaker.

15. The sound reflector of claim 14, wherein the device attachment surface is in a first plane, which is obtuse relative to a tangent at the distal portion of sound redirecting surface.

16. The sound reflector of claim 14, wherein the sound reflector has a length of at least 15 cm and a width of at least 3 cm.

17. The sound reflector of claim 14, wherein the sound redirecting surface is disposed to directly receive a major portion of the sound emanating from the speaker.

18. The sound reflector of claim 14, wherein at least one of the device attachment surface and the sound redirecting surface is curved.

19. The sound reflector of claim 14, further comprising a connector configured to removably couple the sound reflector from the display device.

\* \* \* \* \*